Patented Aug. 29, 1950

2,520,197

UNITED STATES PATENT OFFICE 2,520,197

HYDROLYSIS OF STREPTOMYCIN HYDROCHLORIDE

Norman G. Brink, Princeton, and Karl Folkers, Plainfield, N. J., assignors to Merck & Co. Inc., Rahway, N. J., a corporation of New Jersey No Drawing. Application October 24, 1945, Serial No. 624,334

4 Claims. (Cl. 260—210)

This invention relates to optically-active, hydroxylic, nitrogenous, organic compounds derived from streptomycin and useful as intermediates in the preparation of antibiotics; and particularly to methyl streptobiosaminide dimethyl acetal hydrochloride, its acetylation product methyl tetraacetylstreptobiosaminide dimethyl acetal, and its acid hydrolysis product streptobiosamine hydrochloride.

In a concurrently filed application by Robert L. Peck, Serial No. 624,333, filed October 24, 1945, now abandoned, and the continuation-in-part thereof, Serial No. 650,392, filed February 26, 1946, it is disclosed that upon treatment of streptomycin hydrochloride (obtained, for example, by regeneration from crystalline streptomycin helianthate disclosed in an article by Kuehl, Peck, Walti, and Folkers in Science, 102, 34–35, July 13, 1945) with dilute aqueous, alcoholic, or aqueous-alcoholic mineral acid, a diguanido tetrahydroxy cyclohexane, streptidine, is formed which is readily recovered as an acid salt such as streptidine sulfate, hydrochloride, or the like.

It is now discovered in accordance with the present invention that upon treating streptomycin hydrochloride as stated above and particularly upon treating streptomycin hydrochloride with anhydrous hydrogen chloride in absolute methanol, and then contacting the reaction products in methanol-ether solution with an adsorbent material such as acid washed alumina, the streptidine hydrochloride is taken up by the adsorbent, and from the methanol-ether solution and similar washings a new substance is obtained which is characterized by having optical activity. The optically inactive streptidine hydrochloride is eluted from the adsorbent by further washing with methanol alone.

The selective adsorption and elution above mentioned can be effected by using a chromatographic type tower containing acid washed alumina (aluminum oxide treated with sulfuric acid and washed with water until the pH of the washings is about 4.5; and then dried at elevated temperature), wet packed with the same solvent, methanol ether, that is used as a solvent for the material to be treated. Alternatively, the solution to be treated can be merely contacted with the adsorbent and then separated from the adsorbent by filtration. When the combined methanol-ether filtrate and washings obtained by either of these procedures is evaporated to dryness under vacuum, the new product methyl streptobiosaminide dimethyl acetal hydrochloride is obtained as a light tan powder exhibiting an optical activity $(\alpha)_D^{25} = -143° \pm 2°$ (c, 1.02% in methanol). This substance has an empirical formula $$C_{13}H_{22}NO_7(OCH_3)_3 \cdot HCl.$$

The methyl streptobiosaminide dimethyl acetal hydrochloride is acetylated by reacting with acetic anhydride in pyridine and the acetylated product is recovered by evaporating the reaction mixture to dryness under reduced pressure, taking the residue up in chloroform, washing the chloroform solution with dilute sulfuric acid and with water, removing the chloroform by evaporation and crystallizing the residue thus obtained from ether or from a benzene petroleum-ether mixture. The crystalline methyl tetraacetylstreptobiosaminide dimethyl acetal thus formed, after recrystallization, melts at about 124.5–126° and exhibits an optical rotation $(\alpha)_D^{25} = -124°$ (c, 1.07% in chloroform). This substance has the empirical formula $C_{13}H_{18}NO_7(CH_3CO)_4(OCH_3)_3$.

Upon acid hydrolysis at room temperature in about 3 N aqueous hydrochloric acid, methyl streptobiosaminide dimethyl acetal hydrochloride is converted to streptobiosamine hydrochloride which is a methoxyl-free, optically active compound having the empirical formula $$C_{13}H_{23}NO_9 \cdot HCl.$$

In this compound as well as in the streptobiosaminide compounds above mentioned the nitrogen appears to be present as a methylamino group. This being the case, it would appear that the basic structure of these compounds is a $C_{12}$ structure which is compatible with a disaccharide-like formulation.

The structural formulae of these compounds are believed to be as follows:

Methyl streptobiosaminide dimethyl acetal hydrochloride

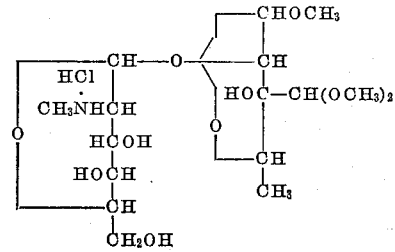

Methyl tetraacetylstreptobiosaminide dimethyl acetal

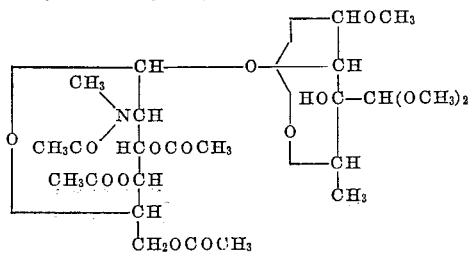

Streptobiosamine hydrochloride

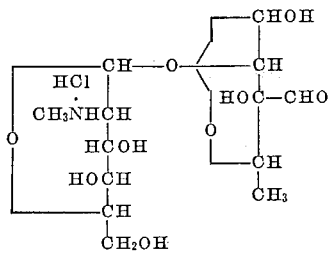

The following examples illustrate methods of carrying out the present invention, but it is to be understood that these examples are given by way of illustration and not of limitation.

*Example I*

A solution of 1.97 g. of dried streptomycin hydrochloride in 100 ml. of absolute methanol containing 1% of hydrogen chloride was allowed to stand for nineteen hours at room temperature. The solvent was then removed in vacuo and the residue evaporated repeatedly with toluene. The product, a light pink powder, weighed 2.14 g.

The material was dissolved in 154 ml. of methanol, 96 ml. of ether added, and the solution was put on a column of 44 g. of alumina wet with a 2:1 methanol-ether mixture. The column was then washed with 193 ml. of a 60% methanol-40% ether mixture. Evaporation of the solvent in vacuo gave 553 mg. of a light tan powder, methyl streptobiosaminide dimethyl acetal hydrochloride, $(a)_D^{25} = -143° \pm 2°$ (c, 1.02% in methanol).

Anal.—Calcd. for $C_{13}H_{20}NO_7(OCH_3)_3 \cdot HCl$: C, 44.49; H, 7.00; N, 3.24; $OCH_3$, 21.6. Calcd. for $C_{13}H_{22}NO_7(OCH_3)_3 \cdot HCl$: C, 44.29; H, 7.57; N, 3.19; $OCH_3$, 21.2. Found: C, 44.35; H, 7.13; N, 4.00; $OCH_3$, 19.1; amino-nitrogen (van Slyke), none.

This product showed only very low absorption in the ultraviolet region. The infra-red spectrum showed a strong band at 2.95 μ.

*Example II*

A solution of 0.919 g. of methyl streptobiosaminide dimethyl acetal hydrochloride in 6.1 ml. of pyridine was cooled to 0° and treated with 4.7 ml. of acetic anhydride. After three hours at 0°, the mixture was allowed to come to room temperature and stand overnight. It was then cooled again to 0° and sufficient water added to decompose the excess acetic anhydride. The solution was evaporated to dryness and the residue taken up in chloroform and washed with dilute sulfuric acid and then with water. The chloroform was removed and the residue crystallized from ether, yielding 0.711 g. of M. P. 122–123°. Recrystallization from ether gave needles of methyl tetraacetylstreptobiosaminide dimethyl acetal of M. P. 124.5°–126°, $(a)_D^{25} = -124°$ (c, 1.07% in chloroform).

Anal.—Calcd. for $C_{13}H_{16}NO_7(CH_2CO)_4(OCH_3)$: C, 50.97; H, 6.95; N, 2.48; $CH_3CO$, 30.5; $OCH_3$, 16.5; mol. wt., 563. Calcd. for $$C_{13}H_{18}NO_7(CH_3CO)_4(OCH_3)_3:$$

C, 50.97; H, 6.95; N, 2.48; $CH_3CO$, 30.5; $OCH_3$, 16.5; mol. wt., 565. Found: C, 50.88; 51.20; H, 7.09; 6.95; N, 2.55; $CH_3CO$, 29.7; $OCH_3$, 15.4; mol. wt., 530 (ebullioscopic in benzene).

The ultra-violet spectrum of this compound showed only a low end absorption, with no maxima. In the infra-red, strong bands were observed at 5.75 μ and at 6.12 μ.

*Example III*

A solution of 388 mg. of methyl streptobiosaminide dimethyl acetal hydrochloride in 10 ml. of 3 N hydrochloric acid was allowed to stand at room temperature for four days, at the end of which time the specific rotation of the material was constant at $(a)_D^{25} = -100°$. Removal of the acid at room temperature under reduced pressure gave 324 mg. of an amorphous solid, streptobiosamine hydrochloride.

Anal.—Found: Methoxyl, none.

Modifications may be made in carrying out the present invention without departing from the spirit and scope thereof, and the invention is to be limited only by the appended claims.

We claim:

1. The process that comprises treating streptomycin hydrochloride with alcoholic mineral acid, evaporating the reaction mixture thus obtained to dryness under vacuum, dissolving the residue after evaporation in methanol-ether, treating the methanol-ether solution with acid washed alumina adsorbent, separating the adsorbent from the solution, evaporating the solution under vacuum and recovering, as the residue after evaporation, methyl streptobiosaminide dimethyl acetal hydrochloride.

2. The process that comprises treating streptomycin hydrochloride with absolute methanol containing about 1% of hydrogen chloride for about 18 to 20 hours at room temperature, evaporating the reaction mixture thus obtained to dryness under vacuum, dissolving the residue after evaporation in methanol-ether, treating the methanol-ether solution with acid washed alumina adsorbent, separating the adsorbent from the solution, evaporating the solution under vacuum and recovering, as the residue after evaporation, methyl streptobiosaminide dimethyl acetal hydrochloride.

3. The process that comprises treating methyl streptobiosaminide dimethyl acetal hydrochloride with about 3 N aqueous hydrochloric acid for about four days at room temperature and until the reaction mixture exhibits a constant optical rotation of about $(a)_D^{25} = -100°$, evaporating to dryness under reduced pressure, and recovering as an amorphous solid, streptobiosamine hydrochloride.

4. The process that comprises treating streptomycin hydrochloride with alcoholic hydrogen chloride, evaporating the reaction mixture thus obtained to dryness under vacuum, dissolving the residue after evaporation in methanol-ether, treating the methanol-ether solution with acid washed alumina adsorbent, separating the adsorbent from the solution, evaporating the solution under vacuum to form a residue of methyl streptobiosaminide dimethyl acetal hydrochloride, treating said residue with about 3 N aqueous hydrochloric acid for about four days at room temperature and until the reaction mixture exhibits a constant optical rotation of about $$(\alpha)_D^{25} = -100°$$

evaporating the reaction mixture to dryness under reduced pressure, and recovering as an amorphous solid, streptobiosamine hydrochloride.

NORMAN G. BRINK.
KARL FOLKERS.

REFERENCES CITED

The following references are of record in the file of this patent:

Waksman et al., Proc. Staff Meet. Mayo Clinic, vol. 19 (1944), pages 545–546.

Carter et al., J. Biol. Chem., vol. 160 (1945), page 339.

Certificate of Correction

Patent No. 2,520,197                                  August 29, 1950

NORMAN G. BRINK ET AL.

It is hereby certified that error appears in the printed specification of the above numbered patent requiring correction as follows:

Column 4, lines 1 and 2, for that portion of the formula reading "$(CH_2CO)_4(OCH_3)$': C, 50.97; H, 6.95; N, 2.48; CH_3CO, 30.5$" read $(CH_3CO)_4(OCH_3)_3$ *C, 51.15; H, 6.62; N, 2.49; CH_3CO, 30.6*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*